US011042473B2

(12) United States Patent
Joyce et al.

(10) Patent No.: US 11,042,473 B2
(45) Date of Patent: Jun. 22, 2021

(54) INTELLIGENT TEST CASE MANAGEMENT FOR SYSTEM INTEGRATION TESTING

(71) Applicant: EMC IP Holding Company LLC, Hopkinton, MA (US)

(72) Inventors: Scott E. Joyce, Foxboro, MA (US); Dan Yuan, Hopkinton, MA (US); Yingying Wang Martin, Southborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 118 days.

(21) Appl. No.: 16/671,734

(22) Filed: Nov. 1, 2019

(65) Prior Publication Data

US 2021/0133086 A1 May 6, 2021

(51) Int. Cl.
*G06F 9/44* (2018.01)
*G06F 11/36* (2006.01)
*G06F 16/25* (2019.01)

(52) U.S. Cl.
CPC ...... *G06F 11/3688* (2013.01); *G06F 11/3664* (2013.01); *G06F 11/3684* (2013.01); *G06F 11/3692* (2013.01); *G06F 16/252* (2019.01)

(58) Field of Classification Search
None
See application file for complete search history.

(56) References Cited

U.S. PATENT DOCUMENTS

| 5,970,005 | A | * | 10/1999 | Yin | G01R 31/318516 365/185.22 |
| 6,487,688 | B1 | * | 11/2002 | Nadeau-Dostie | G01R 31/318558 714/726 |
| 10,178,016 | B1 | * | 1/2019 | Hall | H04W 4/80 |
| 2002/0182800 | A1 | * | 12/2002 | Kuroki | G11C 29/28 438/230 |
| 2003/0164825 | A1 | * | 9/2003 | Baldwin | G06T 15/005 345/419 |
| 2003/0212788 | A1 | * | 11/2003 | Wilding | G06F 11/0793 709/224 |
| 2005/0172185 | A1 | * | 8/2005 | Bancel | G06F 21/75 714/724 |
| 2009/0157236 | A1 | * | 6/2009 | Van Gaasbeck | G05B 15/02 701/3 |
| 2012/0042302 | A1 | * | 2/2012 | Sikandar | G06F 11/3688 717/125 |

(Continued)

*Primary Examiner* — Anna C Deng
(74) *Attorney, Agent, or Firm* — Ryan, Mason & Lewis, LLP

(57) ABSTRACT

Techniques are provided to implement intelligent test case management for system integration testing in a continuous development and integration environment. For example, a system integration testing (SIT) tool obtains feature information regarding features within a feature space of a computing system and an operational status of the features. The SIT tool obtains a plurality of test cases associated with a given feature of the computing system, wherein each test case is mapped to a set of one or more features within the feature space, which are utilized by the test case to execute a test procedure to test the given feature. The SIT tool selects each test case among the plurality of test cases, which is mapped to features that have an active operational status. The SIT tool executes the selected test cases to test the given feature.

20 Claims, 4 Drawing Sheets

(56) References Cited

U.S. PATENT DOCUMENTS

| | | | | |
|---|---|---|---|---|
| 2014/0044265 A1* | 2/2014 | Kocher | .................. | H04L 9/083 |
| | | | | 380/277 |
| 2014/0359755 A1* | 12/2014 | Beitel | .................. | G06F 21/572 |
| | | | | 726/18 |
| 2015/0184505 A1* | 7/2015 | Panicker-Shah | .... | E21B 33/0355 |
| | | | | 702/9 |
| 2017/0249099 A1* | 8/2017 | Jun | ........................ | G11C 17/16 |

* cited by examiner

200

INTELLIGENT TEST CASE MANAGEMENT FOR SYSTEM INTEGRATION TESTING

FIELD

This disclosure relates generally to techniques for system integration testing in a continuous integration environment.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, Software-as-a-Service (SaaS), Infrastructure-as-a-Service (IaaS), and/or Platform-as-a-Service (PaaS). A cloud computing system implements an application programming interface (API) to enable various applications and computing platforms to communicate with and access the cloud computing system, or otherwise allow other applications and computing platforms to integrate within the cloud computing system.

With various types of cloud computing services such as SaaS, an agile software development methodology is implemented to support continuous development and delivery of new and updated services (e.g., incremental builds) in relatively short cycles (e.g., every few weeks). With agile development, different development teams (referred to as "scrum" teams) are assigned to manage different features (e.g., APIs, microservices, functionalities, user interfaces, etc.) of the cloud computing service. Each scrum team is responsible for, e.g., modifying the feature code to satisfy new or changed requirements of the features, fixing defects in the features, fixing performance issues of the features, etc. In this regard, the different features of the cloud computing service are developed, deployed and scaled independently by the different scrum teams and, thus, have their own continuous delivery and deployment stream.

Before new or updated code for a given feature is pushed to the production pipeline, the scrum team responsible for the given feature will typically perform automation testing (e.g., regression testing) to ensure that the given feature is working properly as expected and to ensure that the new or updated/fixed feature does not adversely impact other system features or otherwise result in some regression in the cloud computing system. Such automation testing is typically performed using an automated system integration testing (SIT) tool and a suite of "test cases" that are written and utilized by the SIT tool to test and verify the specific functionalities of the system features and/or the communication among system features. In typical implementations of an SIT tool, regression testing is performed by executing all available test cases within the collection of test cases. However, for some applications, the collection of test cases can be relatively large (e.g., hundreds of test cases). In this regard, automation testing can be relatively expensive in terms of the amount of time that the scrum team needs for testing and the amount of computing resources that are consumed to perform such tests.

SUMMARY

Exemplary embodiments of the disclosure include methods for implementing intelligent test case management for system integration testing in a continuous development and integration environment. For example, in one embodiment, a system integration testing (SIT) tool obtains feature information regarding features within a feature space of a computing system and an operational status of the features. The SIT tool obtains a plurality of test cases associated with a given feature of the computing system, wherein each test case is mapped to a set of one or more features within the feature space, which are utilized by the test case to execute a test procedure to test the given feature. The SIT tool selects each test case among the plurality of test cases, which is mapped to features that have an active operational status. The SIT tool executes the selected test cases to test the given feature.

Other embodiments of the disclosure include, without limitation, computing systems and articles of manufacture comprising processor-readable storage media for implementing test case management for system integration testing.

DETAILED DESCRIPTION

Figure 1:
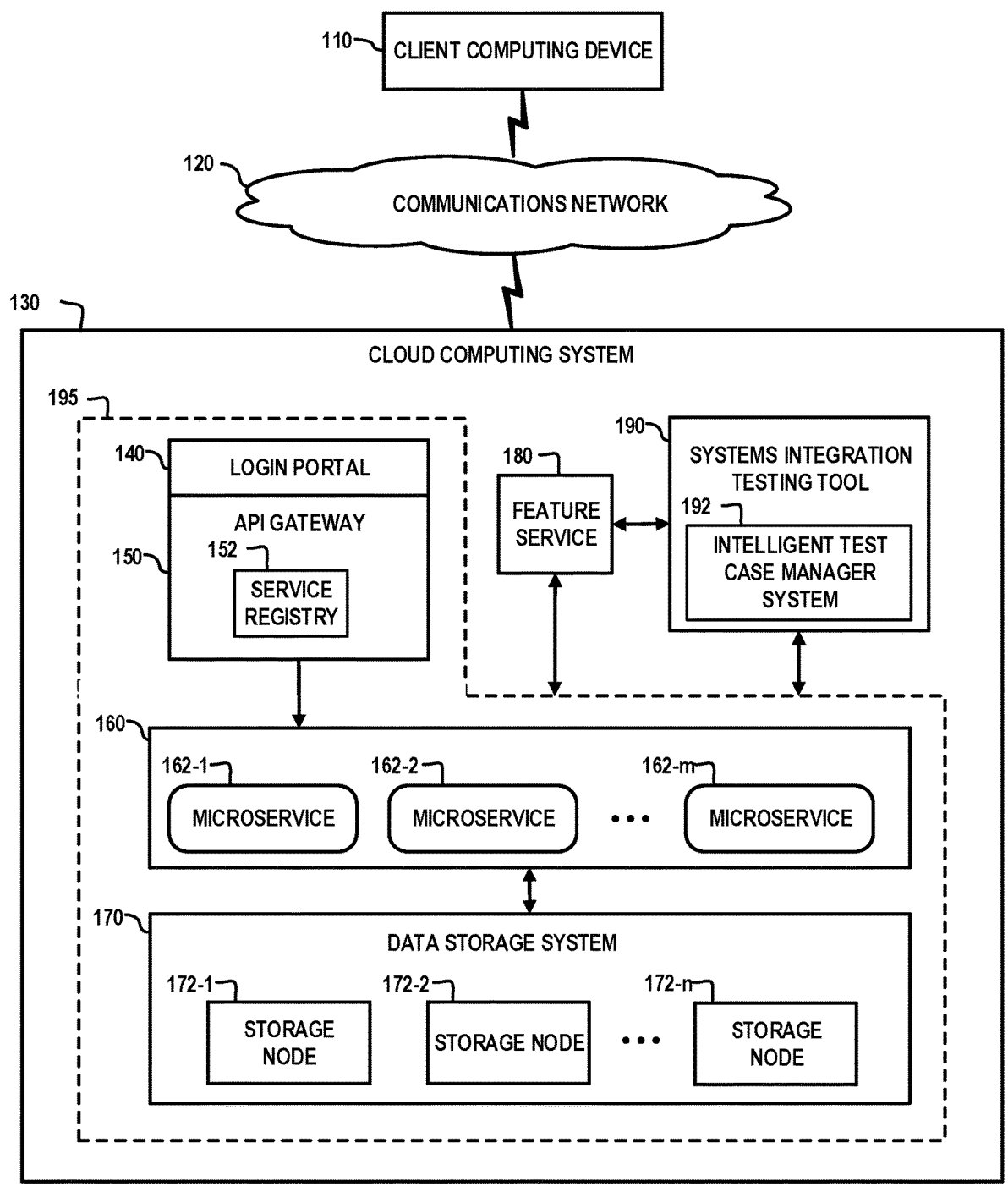
FIG. 1 is a high-level schematic illustration of a system which implements intelligent test case management to support system integration testing in a continuous development and integration environment, according to an embodiment of the disclosure.

Exemplary embodiments of the disclosure will now be described in further detail with regard to systems and methods for implementing intelligent test case management for system integration testing in a continuous development and integration environment. For example, FIG. 1 is a high-level schematic illustration of a system 100 which implements intelligent test case management to support system integration testing in a continuous development and integration environment, according to an embodiment of the disclosure. The system 100 comprises a client computing device 110, a communications network 120, and a cloud computing system 130. The cloud computing system 130 comprises a user login portal 140, an API gateway 150 which comprises a service registry 152, an application platform 160, and a data storage system 170. The cloud computing system 130 further comprises a feature service 180 and a system integration testing tool 190 which comprises an intelligent test case manager module 192. As explained in further detail below, the feature service 180 and the system integration testing tool 190 support intelligent test case management for automation testing of in a continuous development and integration environment.

The client computing device 110 comprises one of various types of computing systems or devices such as a desktop computer, a laptop computer, a workstation, a computer server, an enterprise server, a rack server, a smart phone, an electronic tablet, etc., which can access the cloud computing system 130 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols.

The cloud computing system 130 is configured to perform data processing, data storage, and data management functions to support one or more cloud-based or web-based applications or services and/or other types of applications that are implemented by the application platform 160. The data storage system 170 comprises a plurality of data storage nodes 172-1, 172-2, . . . , 172-n (collectively, data storage nodes 172). The data storage system 170 can be implemented using any suitable data storage system, or combination of data storage systems, including, but not limited to storage area network (SAN) systems, Hadoop Distributed File System (HDFS), as well as other types of data storage systems comprising clustered or distributed virtual and/or physical infrastructure. In some embodiments, the data storage nodes 172 comprise storage appliances with memory controllers, processors, cache memory, and non-volatile storage media to provide persistent storage resources (e.g., file repositories, databases, etc.) for the application platform 160 and other computing nodes of the cloud computing system 130.

The data storage devices of the data storage nodes 172 may include one or more different types of persistent storage devices, or data storage arrays, such as hard disk drives or solid-state drives, or other types and combinations of non-volatile memory. In one embodiment, the data storage nodes 172 are implemented using, for example, an enterprise-class storage platform comprising high-performance, scalable storage arrays, which can be implemented for hyper-scale computing systems. For example, the data storage system 170 can be implemented using commercially available storage array systems and applications.

In the exemplary embodiment of FIG. 1, the application platform 160 comprises a microservices-based architecture which includes plurality of microservices 162-1, 162-2, . . . , 162-m (collectively, microservices 162) that are combined to provide a structured application. As is known in the art, a microservices-based framework implements an application as a collection of loosely-coupled services, wherein the services expose fine-grained APIs and lightweight protocols. Each microservice 162-1, 162-2, . . . , 162-m comprises a self-contained software module with associated functionality and interfaces. In some embodiments, the microservice-based application platform 160 runs in a virtualized environment (e.g., virtual machines) or a containerized environment (e.g., containers) in which the number of instances of a given microservice and the locations (e.g., host and port) of such instances change dynamically.

In the microservices architecture, each microservice 162 (and instances thereof) exposes a set of fine-grained endpoints to access resources provided by the microservice. Each endpoint specifies a location from which APIs can access the resources needed to perform functions. Each microservice 162 maintains its own database in the data storage system 170 in order to be decoupled from other microservices. Data consistency between the distributed microservices 162 is implemented using known techniques such as the Saga pattern. The microservice-based framework enables the individual microservices 162 to be deployed and scaled independently, to be developed and updated in parallel by different teams and in different programming languages, and have their own continuous delivery and deployment stream. While the application platform 160 is generically depicted in FIG. 1, the application platform 180 can implement any suitable cloud-based application. For example, in an exemplary embodiment, the application platform 160 implements a cloud-based application that allows customers to monitor, analyze, and troubleshoot their storage systems or any other type of SaaS application which comprises hundreds of microservices and associated endpoints.

The login portal 140 and the API gateway 150 allow client applications running on client devices (e.g., client computing devices 110) to access the individual microservices 162 of the application platform 160. More specifically, the login portal 140 comprises a user interface which implements methods that allow a user to connect to the cloud computing system 130 (via a computing device 110) and login to the cloud computing system 130 and provide credentials for a user authentication/verification process. In some embodiments, the login portal comprises different user interfaces to support connectivity with different type of devices, e.g. mobile devices, desktop computers, servers, etc., and different types of HTML-based browsers.

The API gateway 150 implements methods that are configured to enable client applications to access the services of the microservices-based application platform 180. In particular, the API gateway 150 provides a single entry point for client applications to issue API requests for services that that are provided by the application platform 160. The API gateway 150 abstracts the client applications from knowing how the application platform 160 is partitioned into microservices, and from having to determine the locations of service instances. The API gateway 150 comprises logic for calling one or more of the microservices 162 in response to a client request. The API gateway 150 communicates with client applications and the microservices 162 using any suitable API framework. For example, in some embodiments, the API gateway 150 and the microservices 162 implement a REST API. In other embodiments, the API gateway 150 and the microservices 162 implement a SOAP API.

In some embodiments, the API gateway 150 is implemented using a single gateway service that is configured to interface with many different types of client applications (e.g., web-based applications, mobile applications, etc.). In other embodiments, the API gateway 150 comprises a plurality of gateway services, each configured to interface with a different type of client application. In all instances, the API gateway 150 performs various functions. For example, the API gateway 150 functions as a reverse proxy to redirect or route requests from client applications to target endpoints of the microservices 162. In this instance, the API gateway 150 provides a single endpoint or Uniform Resource Locator (URL) to receive requests from client applications for access to services of the application platform 160, and internally maps client requests to one or more of the microservices 162.

Furthermore, the API gateway 150 implements aggregation services to aggregate multiple client requests (e.g., HTTP requests) which target multiple microservices 162 into a single request. In this instance, a client application may send a single request to the API gateway 150 to perform a single task, and the API gateway 150 dispatches multiple calls to different backend microservices 162 to execute the task. The API gateway 150 aggregates the results from the multiple microservices and sends the aggregated results to the client application. In this instance, the client application issues a single request and receives a single response from the API gateway 150 despite that the single request is parsed and processed by multiple microservices 162. The API gateway 150 can be configured to implement other functions or microservices to implement authentication and authorization, service discovery, response caching, load balancing, etc.

The service registry 152 generates and maintains a database of microservices 162 of the application platform 160, including a list of all instances of the microservices 162 and the locations of all instances of the microservices 162. Each microservice 162 of the application platform 160 will maintain a list of its valid API endpoints (e.g., REST endpoints) including the paths, methods, headers, URL parameters, supported parameter values, etc., of the API endpoints of the microservice 162. During service startup, the instances of the microservices 162 will push their API endpoint information to the service registry 152. The microservice instances are registered with the service registry 152 on startup and then deregistered on shutdown. The microservices registration information is leveraged in various ways. For example, the API gateway 150 utilizes the registration information to identify available instances of the microservices 162 and their locations to support client request routing and load balancing functions.

The feature service 180 implements methods that are configured to maintain an updated list of all features within a feature space 195 encompassed by the various components 140, 150, 160, and 170 of the computing system 130, and a current operational status (e.g., active or inactive) of each feature within the feature space 195 of the computing system 130. Such features include, e.g., microservices, plugins, core services, etc. The feature service 180 generates a list of currently available features in the feature space 195 in response to an API request from the SIT tool 190. In some embodiments, the feature service 180 leverages registration information from the service registry 152 to generate a list of available features (e.g. microservices) within the feature space 195 of the cloud computing system 130.

The SIT tool 190 is implemented in conjunction with a continuous development and integration software environment of the cloud computing system 130 to perform automation testing on features within the feature space 195 as the features are newly developed, added, updated, fixed, etc., on a continual basis by various scum teams assigned to work on different features within the feature space 195. The SIT tool 190 implements methods that are configured to support automation testing throughout the development, integration, and deployment of the constituent components 140, 150, 160, and 170 of the cloud computing system 130. The SIT tool 190 utilizes various test cases that cover all aspects of the computing system 130 including, but not limited to, user interface functionality (e.g., graphical user interface (GUI)), API functionality, security, microservices, and various other features. The test cases are configured to ensure that the various features are working as expected and that all dependencies between system modules are functioning properly and that data integrity is preserved between distinct modules of the entire computing system 130.

The intelligent test case manager system 192 implements methods that are configured to intelligently select and run tests cases that are designed to test various features of the computing system 130 which are developed/updated by the different scrum teams. For example, the intelligent test case manager system 192 implements methods that are configured to perform functions such as (i) accessing the feature service 180 to obtain feature information regarding features within the feature space 195 of the computing system and the current operational status of the features, (ii) obtaining a plurality of test cases associated with a given feature of the computing system, wherein each test case is mapped to a set of one or more features within the feature space, which are utilized by the test case to execute a test procedure to test the given feature; (iii) intelligently selecting test cases which are mapped to features that have an active operational status, and (iv) executing the selected test cases to test the given feature.

The intelligent test case manager system 192 provides a mechanism by which the SIT tool 190 can intelligently select and run tests cases for features being tested while taking into consideration the current environment (e.g., operational status of features within the feature space) and the changes that are introduced by the new/updated/modified features. With conventional SIT tools, there is typically no mechanism by which a scrum team can select one or more specific tests for a specific feature being developed, so all test cases must be executed, which takes a significant amount of time to perform and consumes a significant amount of computing resources. Indeed, a conventional SIT test run can take 30 minutes or more to fully complete, and a given scrum team may run such test several times a day when working on one or more features in a development environment. In addition, such automation testing system may force development teams to run services which are actually not required for the given feature being tested, but which are required to pass SIT testing, resulting in increased SaaS hosting costs. Moreover, when the automation testing for a specific feature fails, it is difficult for the scrum team to determine if the failure is a result of some error associated with the specific feature being tested or some error associated with a feature that is assigned to another scrum team. In some instances, it may be desirable to push a change to production as soon as possible, without performing a full integration testing process, in which case it would be advantageous to run a limited, yet focused set of tests that will provide some degree of confidence that the changes/updates to the specific feature are proper and will not result in regressions in the system.

In contrast to conventional SIT tools, the intelligent test case manager system 192 allows a scrum team to run test cases which have features that are currently active in the feature space, while avoiding having to run features or services that are inactive or otherwise not required for testing the specific feature under development. Consequently, the intelligent test case manager system 192 allows for a reduced SIT execution time and, thus an improvement in the deployment cycle, as well as reduced consumption in computing resources need to perform automation testing.

Figure 2:
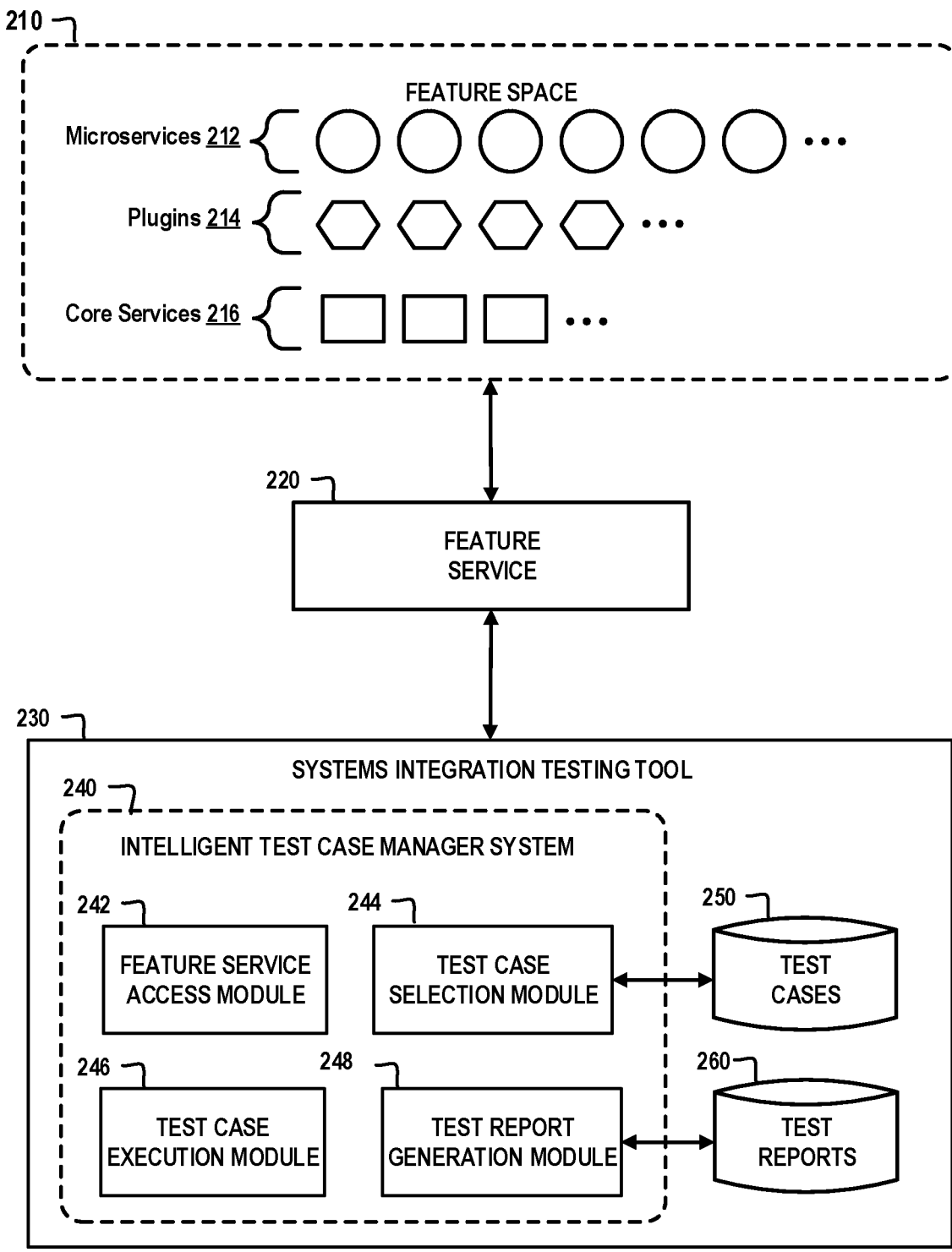
FIG. 2 schematically illustrates a testing environment which implements a SIT tool that comprises an intelligent test case management system to support automation testing in a continuous development and integration environment, according to an embodiment of the disclosure.

FIG. 2 schematically illustrates a testing environment 200 which implements a SIT tool that comprises an intelligent test case management system to support automation testing in a continuous development and integration environment, according to an embodiment of the disclosure. More specifically, the testing environment 200 comprises a feature space 210, a feature service 220, and an SIT tool 230. The SIT tool 230 comprises an intelligent test case manager system 240, a database of test cases 250, and a database of test reports 260. The intelligent test case manager system 240 comprises a feature service access module 242, a test case selection module 244, a test case execution module 246, and a test report generation module 248.

The feature space 210 comprises a plurality of microservices 212, plugins 214 and core services 216. The feature space 210 generically represents all features and constituent components of features that are currently available in given environment of a computing system under test (SUT). For example, in the context of the exemplary embodiment of FIG. 1, the feature space 210 represents all the features and constituent sub-components of features that are utilized to implement the system components 140, 150, 160, and/or 170 of the computing system 130. For example, the microservices 212 can represent microservices that are implemented by the login portal 140, the API gateway 150, and the application platform 160, to perform various functions supported by such system components. The plugins 214 represent software components that may be developed via an integrated development environment (IDE) tool to provide additional/extended functionalities for, e.g., user interface browsers, the core services 216, and other system components to execute functions. The core services 216 comprise "third-party" features that are utilized by the computing system 130, but not necessarily developed/updated in the continuous integration environment of the computing system 130. For example, the core services 216 represent software systems such as database management systems (e.g., relational database management system (RDBMS) implemented using Structured Query Language (SQL)), search engines (e.g., Elasticsearch), statistical computing/data analytics (e.g., R Analytics), etc., and other types of core services that may be utilized in the given computing system environment. It is to be understood that in the context of the exemplary embodiments discussed herein, a given "feature" that is under development by a scrum team may consist of a single component within the feature space 210 (e.g., a single microservice 212 or plugin 214), or the given feature being developed may comprise multiple components of features within the feature space 210 to implement an end-to-end function. For example, a global search feature may leverage a plurality of microservices 212 and plugins 214 to implement a global search function. In this regard, it is to be understood that the various feature components in the given feature space 210 do not necessarily map 1:1 with a given feature that is managed by a given scrum team.

The feature service 220 implements methods that are configured to identify features and components of features that exist in the given feature space 210. In some embodiments, the feature service 220 is configured to identify all available features within the feature space 210 and the operational status of such features. For example, the feature service 200 can be configured to generate a list of all available features 212, 214, and 216 that exist within the feature space 210 along with information which specifies the operational status of such features within the feature space 210. For example, the operational status of a given feature can be determined to be one of: (i) deployed and running; (ii) deployed but stopped; (iii) deployed but inoperable (e.g., crashed); (iv) not deployed, etc. In some embodiments, a publish-subscribe messaging system is implemented in which notification messages are pushed by the various features within the feature space 210 to the feature service 220 to enable the feature service 220 to identify all currently existing features within the feature space 210 and the operational status of such features. In some embodiments, the notification messages comprise the same or similar registration information which the features send to the service registry 152 of the API gateway 150.

The feature service 220 utilizes the status information of features within the feature space 210 to generate and continually update a feature list of all existing features and the operational status of such features. In some embodiments, the feature service 220 maintains a mapping of features-to-content, wherein such mapping identifies a set of component features (or sub-features) that make up a given feature. In other words, such mapping allows the feature service 220 to determine dependencies among features 212, 214 and 216 within the given feature space 210.

The intelligent test case manager system 240 of the SIT tool 230 leverages the feature service 220 to perform intelligent test case selection and automated testing of features within the feature space 210 of the development environment. For example, the feature service access module 242 implements methods that are configured to access and communicate with the feature service 220 to obtain feature information regarding the features 212, 214, and 216 within the feature space 210 of the computing system and the operational status (e.g., active or inactive) of the features 212, 214, and 216. The test case selection module 244 implements methods that are configured to access the database of test cases 250 to obtain a plurality of test cases associated with a given feature being tested, and select each test case (among the plurality of test cases obtained from the database of test cases 250) which is mapped to features that have an active operational status. As explained in further detail below, each test case within the database of test cases 250 is mapped to a set of one or more features within the feature space 210, which are utilized by the test case to execute a test procedure associated with the test case. The test case selection module 244 parses the obtained feature information and the set of test cases to intelligently select test cases for execution by the test case execution module 246. The test report generation module 248 generates a test report for each SIT run on a given feature. The test reports generated by the test report generation module 248 are stored in the database of test reports 260 for subsequent access and analysis.

The database of test cases 250 comprises various types of test cases that are designed to test specific functions of specific features within the feature space 210 and to test common (or universal) functions that are implement by many features within the feature space 210. Each test case defines a set of one or more actions that are executed to verify the functionality of a particular feature or the functionalities of a set of features that collectively operate to perform a given function. The database of test cases 250 can include test cases that are specifically written by different scrum teams to specifically test the features assigned to the scrum teams. In addition, the database of test cases 250 can include a collection of pre-defined test cases that are used to test common functionalities that are implemented by many features within the given feature space 210. Each test case can include various elements including, e.g., (i) an identifier of a feature which is associated with the test case; (ii) test data (e.g., variables and values); (iii) a test procedure to be performed; (iv) a mapping of features within the feature space, which are utilized by the test case to execute a test procedure; (v) an expected result, and (vi) pass/fail criteria, etc.

By way of example, the following test cases can be specified to test a functionality a "login feature" of the login portal 140 in the cloud computing system 130. A first test case can be defined to check the result/response that is obtained when a valid User ID and password are entered into associated fields of a login screen. A second test case can be specified to check the result/response that is obtained when an invalid user ID and/or invalid password is entered in the associated fields of the login screen. A third test case can be defined which checks a response that is obtained when one of the User ID and/or password fields are empty, and a login button is pressed. In this example, the test cases may rely on another system feature (e.g., authentication microservice) which is called by the "login" feature to authenticate a given user based on the entered credentials.

Figure 3:
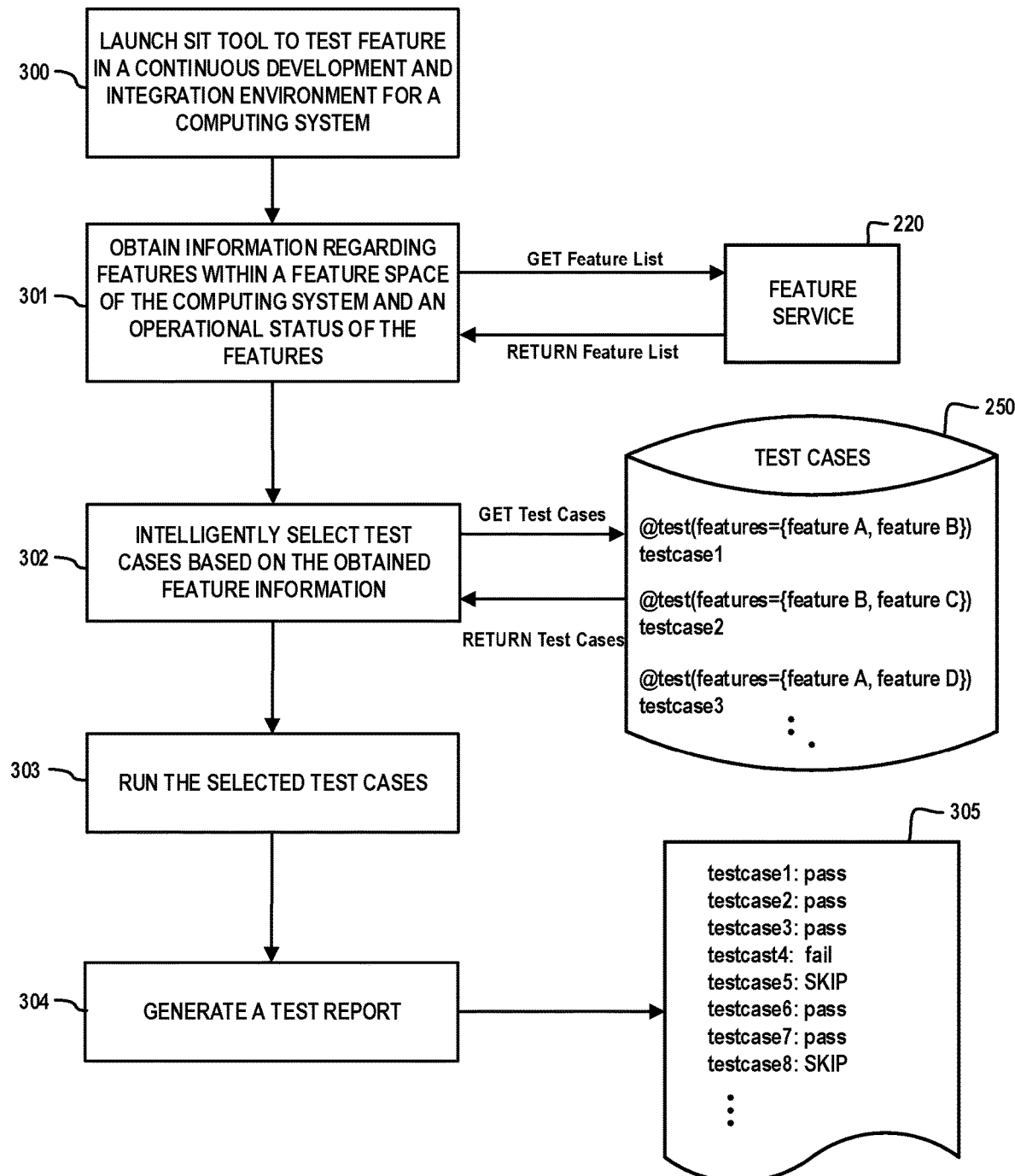
FIG. 3 is a flow diagram of method to perform automation testing of a given feature in a development environment using a SIT tool that is configured to intelligently select and run tests cases for the given feature, according to an embodiment of the disclosure.

FIG. 3 is a flow diagram of method to perform automation testing of a given feature in a development environment using a SIT tool that is configured to intelligently select and run tests cases for the given feature, according to an embodiment of the disclosure. For illustrative purposes, the process flow of FIG. 3 will be discussed in the context of the testing environment 200 and the SIT tool 230 of FIG. 2, wherein it is assumed that FIG. 3 illustrates exemplary operating modes of the intelligent test case manager system 240 of the SIT tool 230. The process begins with a given scrum team launching the SIT tool 230 in a continuous development and integration environment for a computing system to test a given feature that the given scrum team is working on (block 300). The given feature being tested may be a new feature to be added to the feature space of the computing system or an existing feature that has been updated/fixed, etc. The given feature may comprise a single isolated feature within the feature space of the computing system, or the given feature may leverage multiple existing features within the feature space of the computing system. It is assumed that the database of test cases 250 comprises a set of specific test cases that have been written by the scrum team for testing the given feature and/or a set of one or more pre-defined test cases that are designed to test general functions associated with the given feature.

A next step in the process flow comprises obtaining information regarding features within the feature space of the computing system and the operational status of such features (block 301). In some embodiments, the obtaining step is automatically performed by the feature service access module 242 sending a query (e.g., API request) to the feature service 220 to obtain a list of features that are currently active (e.g., deployed and running) within the feature space 210 of the computing system. In response to the query, the feature service 220 will return a list of currently active features to the SIT tool 230. As noted above, the feature service 220 obtains and maintains up-to-date information regarding all features within the feature space 210 of the computing system and the operational status of each of the features. The feature service 220 utilizes this information to identify those features within the feature space 210 which are active (e.g., deployed and running), and returns a list of such active features to the SIT tool 230. In this embodiment, the feature list will identify only those features within the feature space 210 of the computing system which are currently active.

In other embodiments, the feature service 220 will return a list of all features within the feature space 210 and the current operational status of each of the features. For example, as noted above, the operational status of a given feature can be one of (i) deployed and running; (ii) deployed but stopped; (iii) deployed but inoperable (e.g., crashed); (iv) not deployed, etc. A given feature is deemed active if the feature is currently deployed and running. On other hand, a given feature can be deemed inactive if it is deployed but stopped (e.g., not running). A given feature (e.g., microservice) can be automatically or manually stopped in instances where the given feature is no longer being utilized (either permanently or temporarily) in the computing environment for certain reasons.

Further, a given feature can be deemed inactive if the given feature is deployed yet inoperable for certain reasons. For example, a core service 216 such as a database system may be deemed inactive if the database system is currently deployed but has crashed and is currently not operating and not accessible. A given feature can be deemed inactive in instances where the given feature is being developed, updated, etc., and not yet deployed in the computing environment. It this instance, there can be test cases that exist which are associated with the non-deployed feature, and which are written to test or otherwise utilize the non-deployed feature. In other embodiments, a given feature can be deemed "inactive" in instances wherein the given feature is actually deployed and running, but utilizes at least one other feature that is inactive. In this instance, the otherwise active feature may be rendered useless if it relies on one or more features that are currently inactive. In all such instances, the execution of a test case that relies on an inactive feature would fail, and thus execution of such tests can be avoided by knowing which features have an inactive operational status.

In other embodiments, the feature service 220 can be instructed to generate and return a list of features that identifies a subset of active features or which specifically excludes information regarding certain features. For example, the query that is sent from the feature service access module 242 to the feature service 220 can include a configuration value for a given test environment, as specified by the scrum team, which identifies a subset of features to be returned for performing specific targeted tests. In this instance, the feature service 220 will select a subset of features within the feature space 210 which are desired by the scrum team to perform targeted testing. In another embodiment, a user interface can be implemented on top of the feature service 220 to allow a developer to view all the features within the feature space 210 and the associated operational status of such features. The user interface would give the developer the option to select or deselect (via a toggle button) the displayed features, and thus allow the developer to override the system. For example, the developer could toggle "off" one or more active features so that such active feature would not be included or otherwise identified as an active feature in the feature list returned to the SIT tool 230.

A next step in the process flow comprises intelligently selecting test cases based on the obtained feature information (block 302). In some embodiments, the selecting step is automatically performed by the test case selection module 244. For example, the test case selection module 244 will send a query to the database of test cases 250 to obtain a set of test cases that are associated with the feature being tested. The returned set of test cases will include (i) test cases that are designed to test the functionality of the given feature being tested and (ii) test cases that are associated with other features which utilize the given feature being tested.

The test case selection module 244 will execute a script to parse the feature list returned from the feature service 220 and determine those features in the feature list which are identified as being active. In some embodiments, the feature list will include only those features which are currently active. In this instance, test case selection module 244 will determine the feature ID and assume that all listed features are active. In other embodiments, the feature list will include all features, or a subset of selected features, within the feature space and the operational status of the features. In this instance, the test case selection module 244 will parse the information in the feature list to determine the feature ID and determine the operational status of the features (e.g., active or inactive).

The test case selection module 244 will parse through the returned set of test cases to determine, for each test case, the set of features that each test case relies on to execute the associated test procedure. As noted above, each test case is mapped to a set of one or more features which are utilized by the test case to execute the associated test procedure. For example, as shown in FIG. 3, the database of test cases 250 illustrates three exemplary test cases, wherein a first test case (testcase1) relies on features A and B to execute the associated test procedure, wherein a second test case (testcase2) relies on features B and C to execute the associated test procedure, and wherein a third test case (testcase3) relies on features A and D to execute the associated test procedure.

In some embodiments, the test case selection module 244 will select for execution only those test cases (in the returned set of test cases) which utilize features that are identified as being currently active, while ignoring those test cases (in the returned set of test cases) which have at least one feature that is identified as being inactive for a given reason. For example, assume that a given feature A (e.g., microservice) is being tested and that a test case for the given feature A relies on another feature B (e.g., a core service such as a SQL database) to perform the associated test procedure. In this instance, if the other feature B is inactive for any reason, the test case for feature A would not be executed as it would fail due to the unavailability of feature B. In fact, as noted above, if the given feature A relies on the feature B to properly operate, the given feature A may be deemed "inactive" by the feature service 220 if the feature B is deemed currently inactive. In this instance, even if feature A is currently active and running, feature A may effectively be inoperable without the ability to utilize feature B.

In some embodiments, the test case selection module 244 can also select for execution certain test cases (in the returned set of test cases) which utilize features that are identified as being inactive for a given reason. For example, assume the given feature being tested is a GUI which utilizes different features such as plugins for implementing certain functions. If a given feature (e.g., plugin) utilized by the GUI is currently inactive and operates independent of other active features of the GUI, the functionalities of the GUI feature can still be tested with respect to other active features, while disabling the inactive feature of the GUI feature.

A next step in the process flow comprises executing the selected test cases (block 303). In some embodiments, the test case execution module 246 runs the test cases that are selected for execution by the test case selection module 244. In some embodiments, the test case execution module 246 leverages the feature information provided by the feature service 220 to identify the features that are currently active. In this instance, the test case execution module 246 can dynamically modify a GUI that is associated with the test case execution module 246 to display only those features and content which are currently active and running, while not displaying features that are currently inactive.

In other embodiments, the test case selection module 244 can be configured to identify a test case among the plurality of test cases which is mapped to an inactive feature, and the test case execution module 246 can be configured to modify the given feature to be tested by disabling a portion of the given feature which relies on the inactive feature to perform a given function. In this instance, the test case execution module 246 will execute the modified feature using the identified test case.

A next step in the process flow comprises generating a test report which comprises test results obtained from executing the selected test cases (block 304). For example, FIG. 3 illustrates an exemplary test report 305 which can be generated by the report generation module 248. As shown in FIG. 3, the test report 305 provides a status of the execution results (e.g., pass or fail) of the selected test cases that were executed. In addition, the test report 305 identifies the test cases that were not selected for execution (e.g., SKIP). In particular, the exemplary test report 305 of FIG. 3 indicates that testcase5 was skipped. A given test case will be skipped when, e.g., the given test case utilizes at least one feature which is deemed inactive.

Figure 4:
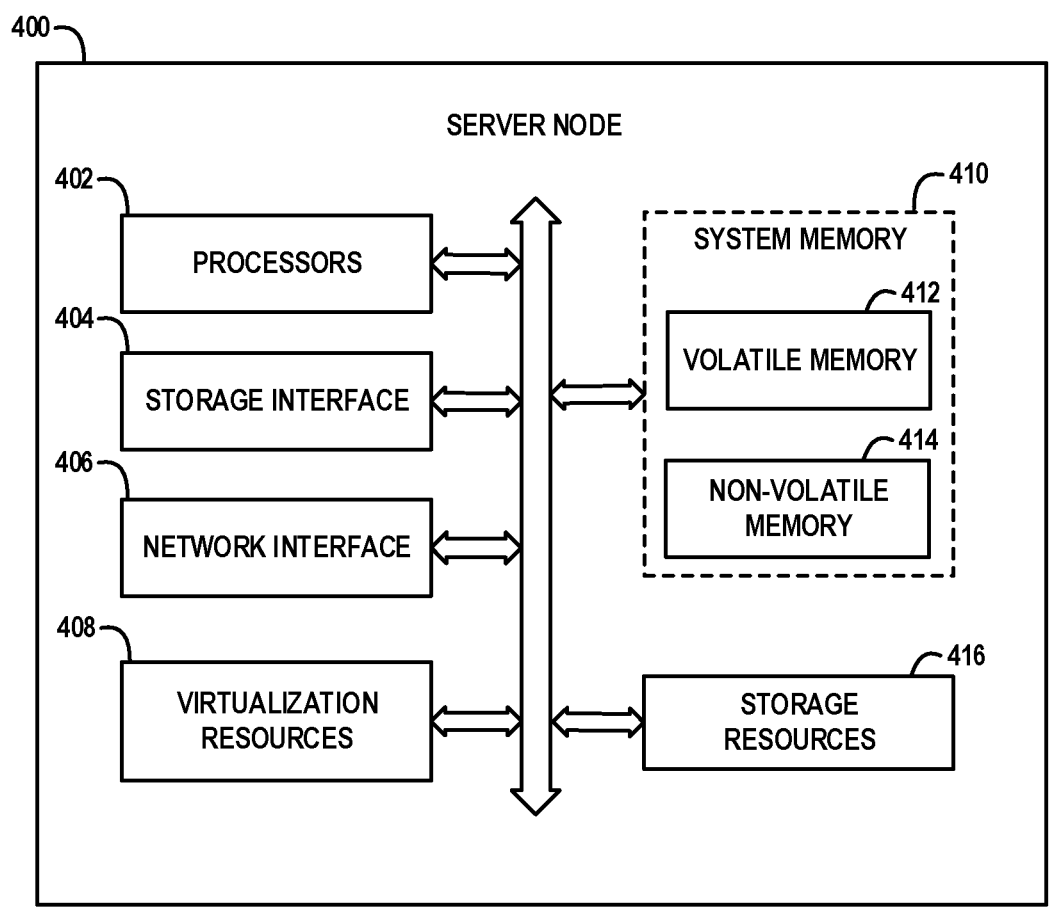
FIG. 4 schematically illustrates framework of a server node which can be implemented for hosting the SIT tool of FIG. 2, according to an exemplary embodiment of the disclosure.

It is to be understood that the various software modules of the SIT tool 230 of FIG. 2 can be implemented on one or more server nodes. For example, FIG. 4 schematically illustrates framework of a server node which can be implemented for hosting the SIT tool of FIG. 2, according to an exemplary embodiment of the disclosure. The server node 400 comprises processors 402, storage interface circuitry 404, network interface circuitry 406, virtualization resources 408, system memory 410, and storage resources 416. The system memory 410 comprises volatile memory 412 and non-volatile memory 414.

The processors 402 comprise one or more types of hardware processors that are configured to process program instructions and data to execute a native operating system (OS) and applications that run on the server node 400. For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 408 can be instantiated to execute one or more services or functions which are hosted by the server node 400. For example, the virtualization resources 408 can be configured to implement the various modules and functionalities of the SIT tool 230 of FIG. 2 as discussed herein. In one embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well the various modules and functionalities of the SIT tool 230 of FIG. 2 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the SIT tool 230 comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of a NAND Flash storage device, a SSD device, or other types of next generation non-volatile memory (NGNVM) devices. The system memory 410 can be implemented using a hierarchical memory tier structure wherein the volatile system memory 412 is configured as the highest-level memory tier, and the non-volatile system memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
receiving, by a system integration testing (SIT) tool, a given feature to be tested for integration of the given feature in a computing system;
obtaining, by the SIT tool, feature information which comprises a list of features within a feature space of the computing system and a current operational status of each of the features in the list of features;
accessing, by the SIT tool, a database of test cases to obtain a set of test cases associated with the given feature to be tested, wherein each test case of the set of test cases is mapped to an associated set of one or more features within the feature space of the computing system, wherein the associated set of one or more features of a given test case are utilized by the given test case to execute a test procedure specified by the given test case to test the given feature;
utilizing, by the SIT tool, the obtained feature information to determine, for each test case of the set of test cases, whether each feature of the associated set of one or more features of the test case has an active operational status;
selecting, by the SIT tool, test cases in which each test case is determined to have an associated set of features in which each feature has an active operational status; and
executing, by the SIT tool, the selected test cases to test the given feature.

2. The method of claim 1, wherein obtaining the feature information comprises accessing, the SIT tool, the feature information from a feature service that is configured to maintain an updated list of all features within the feature space of the computing system, and the operational status of each feature within the feature space of the computing system.

3. The method of claim 1, wherein a given feature within the feature space of the computing system is deemed active if the given feature is deployed and running in the computing system, and wherein the given feature is deemed inactive if the given feature is one of: (i) deployed and stopped; (ii) deployed and inoperable; (iii) not yet deployed; and (iv) deployed and running, but utilizes at least one other feature that is inactive.

4. The method of claim 1, wherein obtaining the feature information comprises obtaining a list of all active features within the feature space of the computing system.

5. The method of claim 1, wherein obtaining the feature information comprises obtaining a list of all features within the feature space of the computing system and an indication of a current operational status of each feature as being active or inactive.

6. The method of claim 1, wherein obtaining the plurality set of test cases associated with the given feature comprises accessing the database of test cases to obtain test cases that are configured to test functions of the given feature.

7. The method of claim 6, wherein accessing the database of test cases further comprises obtaining a test case that is configured to test functions of at least one other feature which utilizes the given feature.

8. The method of claim 1, further comprising generating, by the SIT tool, a test report which specifies a test result for each executed test case and which identifies each test case of the set of test cases that was not selected for execution.

9. The method of claim 1, further comprising:
identifying, by the SIT tool, a given test case of the plurality set of test cases which is mapped to an inactive feature;
modifying the given feature to be tested by disabling a portion of the given feature which relies on the inactive feature of the given test case to perform a given function; and
executing the modified feature using the given test case.

10. An article of manufacture comprising a non-transitory processor-readable storage medium having stored therein program code of one or more software programs, wherein the program code is executable by one or more processors to implement a method comprising:
receiving, by a system integration testing (SIT) tool, a given feature to be tested for integration of the given feature in a computing system;
obtaining, by the SIT tool, feature information which comprises a list of features within a feature space of the computing system and a current operational status of each of the features in the list of features;
accessing, by the SIT tool, a database of test cases to obtain a set of test cases associated with the given feature to be tested, wherein each test case of the set of test cases is mapped to an associated set of one or more features within the feature space of the computing system, wherein the associated set of one or more features of a given test case are utilized by the given test case to execute a test procedure specified by the given test case to test the given feature;
utilizing, by the SIT tool, the obtained feature information to determine, for each test case of the set of test cases, whether each feature of the associated set of one or more features of the test case has an active operational status;
selecting, by the SIT tool, test cases in which each test case is determined to have an associated set of features in which each feature has an active operational status; and
executing, by the SIT tool, the selected test cases to test the given feature.

11. The article of manufacture of claim 10, wherein obtaining the feature information comprises accessing, the SIT tool, the feature information from a feature service that is configured to maintain an updated list of all features within the feature space of the computing system, and the operational status of each feature within the feature space of the computing system.

12. The article of manufacture of claim 10, wherein a given feature within the feature space of the computing system is deemed active if the given feature is deployed and running in the computing system, and wherein the given feature is deemed inactive if the given feature is one of: (i) deployed and stopped; (ii) deployed and inoperable; (iii) not yet deployed; and (iv) deployed and running, but utilizes at least one other feature that is inactive.

13. The article of manufacture of claim 10, wherein obtaining the feature information comprises obtaining a list of all active features within the feature space of the computing system.

14. The article of manufacture of claim 10, wherein obtaining the feature information comprises obtaining a list of all features within the feature space of the computing system and an indication of a current operational status of each feature as being active or inactive.

15. The article of manufacture of claim 10, wherein obtaining the set of test cases associated with the given feature comprises accessing the database of test cases to obtain test cases that are configured to test functions of the given feature.

16. The article of manufacture of claim 15, wherein accessing the database of test cases further comprises obtaining a test case that is configured to test functions of at least one other feature which utilizes the given feature.

17. The article of manufacture of claim 10, wherein the program code is executable by the one or more processors to implement a method comprising generating, by the SIT tool, a test report which specifies a test result for each executed test case and which identifies each test case of the set of test cases that was not selected for execution.

18. The article of manufacture of claim 10, wherein the program code is executable by the one or more processors to implement a method comprising:
   identifying, by the SIT tool, a given test case of the set of test cases which is mapped to an inactive feature;
   modifying the given feature to be tested by disabling a portion of the given feature which relies on the inactive feature of the given test case to perform a given function; and
   executing the modified feature using the given test case.

19. A server node, comprising:
   at least one processor; and
   system memory configured to store program code, wherein the program code is executable by the at least one processor to instantiate a system integration testing (SIT) tool, wherein the SIT tool is configured to:
   receive a given feature to be tested for integration of the given feature in a computing system;
   obtain feature information which comprises a list of features within a feature space of the computing system and a current operational status of each of the features in the list of features;
   access a database of test cases to obtain a set of test cases associated with the given feature to be tested, wherein each test case of the set of test cases is mapped to an associated set of one or more features within the feature space of the computing system, wherein the associated set of one or more features of a given test case are utilized by the given test case to execute a test procedure specified by the given test case to test the given feature;
   utilize the obtained feature information to determine, for each test case of the set of test cases, whether each feature of the associated set of one or more features of the test case has an active operational status;
   select test cases in which each test case is determined to have an associated set of features in which each feature has an active operational status; and
   execute the selected test cases to test the given feature.

20. The server node of claim 19, wherein the SIT tool is configured to obtain the feature information by accessing the feature information from a feature service that is configured to maintain an updated list of all features within the feature space of the computing system, and the operational status of each feature within the feature space.

* * * * *